United States Patent [19]

Burkhardt et al.

[11] Patent Number: 4,492,987
[45] Date of Patent: Jan. 8, 1985

[54] PROCESSOR FOR ENHANCING VIDEO SIGNALS FOR PHOTOGRAPHIC REPRODUCTION

[75] Inventors: James L. Burkhardt, Watertown; John J. McCann, Belmont, both of Mass.

[73] Assignee: Polaroid Corporation, Cambridge, Mass.

[21] Appl. No.: 360,468

[22] Filed: Mar. 22, 1982

[51] Int. Cl.³ .............................................. H04N 5/76
[52] U.S. Cl. .................................................. 358/332
[58] Field of Search ............... 358/78, 80, 332, 334, 358/76, 27, 32, 75, 244, 244.1, 244.2

[56] References Cited

U.S. PATENT DOCUMENTS

| | | | |
|---|---|---|---|
| 2,704,784 | 3/1955 | Hammond | 358/244 |
| 3,633,044 | 1/1972 | Buckstad | 358/345 |
| 3,644,664 | 2/1972 | Huboi et al. | 178/5.2 A |
| 3,772,465 | 11/1973 | Vlahos et al. | 178/5.2 D |
| 3,879,750 | 4/1975 | Seckel et al. | 358/80 |
| 4,178,608 | 12/1979 | Shirato | 358/21 R |
| 4,263,001 | 4/1981 | Deutsch | 355/45 |
| 4,285,580 | 8/1981 | Murr | 351/35 |

OTHER PUBLICATIONS

Pages 288 and 290 from Focal Encyclopedia of Photography, by McGraw-Hill Book Company.

Primary Examiner—John C. Martin
Assistant Examiner—Erin A. McDowell
Attorney, Agent, or Firm—Edward S. Roman

[57] ABSTRACT

A signal processor for selective use with a conventional color television receiver for modifying the color image displayed on the screen of the receiver in order to enable a color photograph to be made by directly exposing a photosensitive material to the modified color image displayed on the screen of the receiver such that the photographic image is of an appearance substantially corresponding to the appearance of the image otherwise displayed on the screen of the receiver when the signal processor is not in use.

17 Claims, 6 Drawing Figures

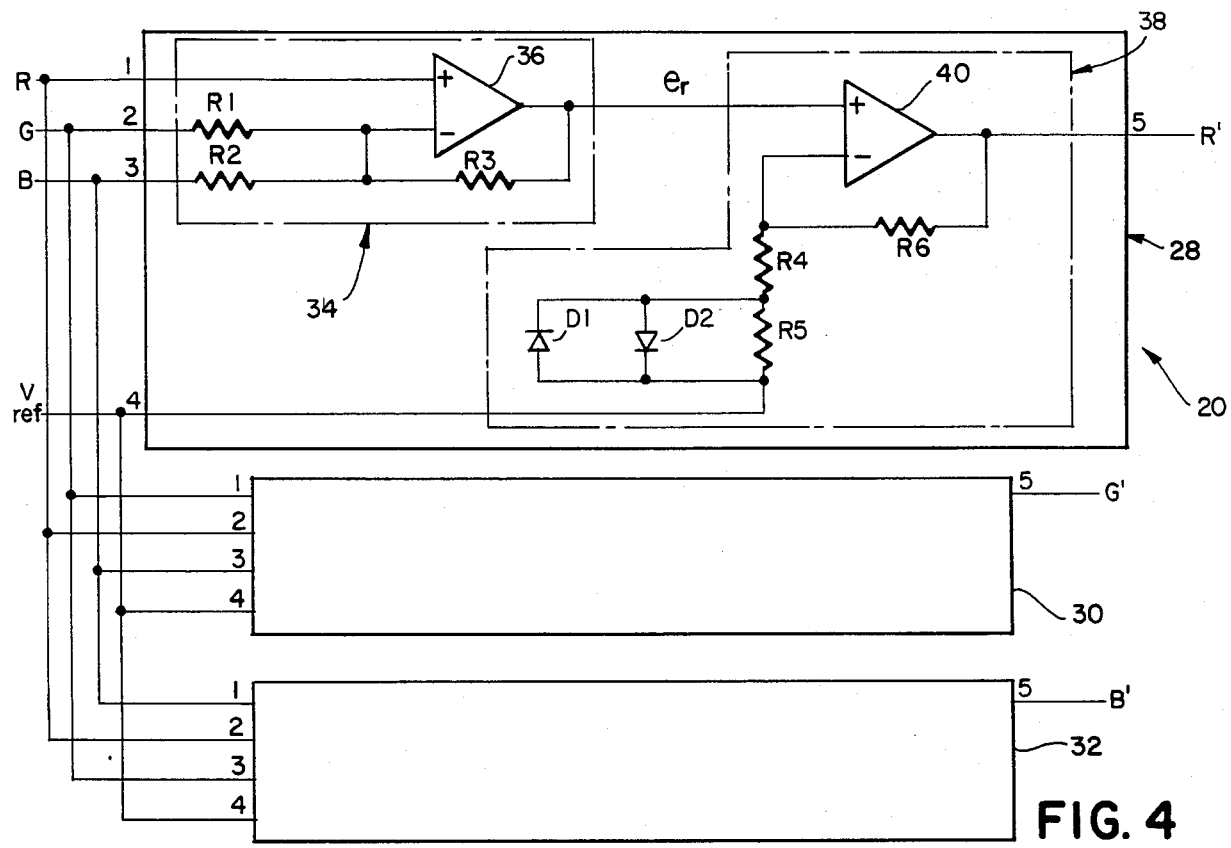
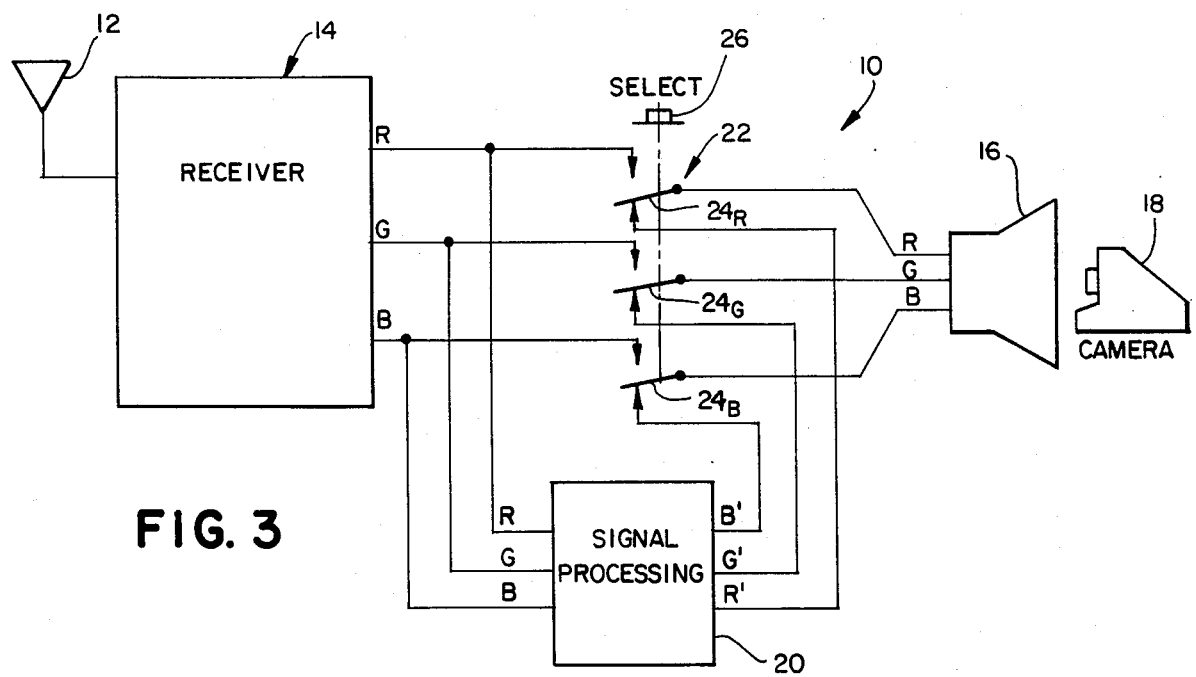
FIG. 4
FIG. 3

PROCESSOR FOR ENHANCING VIDEO SIGNALS FOR PHOTOGRAPHIC REPRODUCTION

BACKGROUND OF THE INVENTION

1. Field of the Invention

This invention relates generally to a video signal enhancer for photographic reproduction and, more particularly, to a signal processor for use with a television receiver in order to enhance the video signals for photographic reproduction.

2. Description of the Prior Art

One approach for obtaining a photographic image of a color television image is to directly photograph the screen of a color television using color film. This approach will reproduce the subject matter in a way in which, while satisfactory for some purposes, is of a quality much poorer than that of a direct photograph of the scene being televised in terms of color rendition, contrast, etc. This poor quality results from, among other things, the mismatch in the spectral emission properties of the phosphors of the television cathode ray tube and the spectral sensitivities in the photosensitive layers of the film; and the mismatch between the nonlinear grey scale sensitivity of the film and the generally linear response of the cathode ray tube. Thus, other techniques have been developed which first divide the color television signal into its color separation video signals, i.e., red, blue, and green video signals, and then sequentially display the signals on a monochromatic CRT whose screen is photographed through filters in a way that synchronizes the color of the filter to the color of the video signal being displayed on the screen. Thus, in this technique, color film is exposed through a red filter to the image on the screen of a monochromatic CRT while the red color separation image is displayed, through a blue filter while a blue color separation image is displayed on the CRT and through a green filter while the green color separation image is displayed. The exposure times will depend on the optics, the phosphors of the CRT and the type of film; and, the proper exposure time can be determined by trial and error. While this technique will provide an improved photograph over the quality of an image that is provided by photographing the entire color picture directly from the screen of the cathode ray tube, it still nevertheless requires that the red, green, and blue filters be sequentially moved by mechanical apparatus into place to expose the film to red, green, and blue color separation signals. Thus, the time for taking a photograph is extended, and a mechanical apparatus for moving the filters in this manner must be provided. Although this technique does not encounter the aforementioned difficulties resulting from the spectral emission properties of the cathode ray tube phosphors not matching the spectral sensitivities in the photosensitive layers of the film, it nevertheless fails to compensate for films of high contrast having nonlinear sensitivity curves.

Therefore, it is a primary object of this invention to provide a signal processor for a conventional television receiver in order to enable a photograph to be made directly from the screen of the receiver such that the photographic image is of an appearance substantially corresponding to the appearance of the image otherwise displayed on the screen of the receiver.

It is a further object of this invention to provide a signal processor for use with a conventional television receiver in order to enable the screen of the television receiver to be directly photographed to provide a high quality photographic image without the necessity of sequentially exposing the film through red, green, and blue filters.

Other objects of the invention will be in part obvious and will in part appear hereinafter. The invention accordingly comprises a system possessing a construction, combination of elements and arrangement of parts which are exemplified in the following detailed disclosure.

SUMMARY OF THE INVENTION

A signal processor is provided for use with a color television receiver of the type having a color cathode ray tube. The signal processor comprises circuit means for receiving color video signals from the color television receiver in order to impose a select transfer function to the received color video signals which function generally approximates the inverse of the transfer function of a selected photographic reproduction process. The processor thus produces modified video signals which when transmitted to the television receiver operate to produce an image on the cathode ray tube of the television receiver in accordance with the select transfer function so that a photographic image of the screen of the cathode ray tube made by the selected photographic process substantially corresponds to the video image which would otherwise be displayed on a screen of the cathode ray tube if the video signals had not been modified by the circuit means. Means are also provided for selectively connecting the circuit means to receive the video signals from the receiver and to transmit the modified video signals back to the receiver.

The circuit means may also include means for further modifying the video signals so that when the modified video signals are transmitted to the television receiver, the saturation of the imaged colors is increased to at least partly compensate for a mismatch in the spectral emission properties of the phosphors in the cathode ray tube and the spectral sensitivities in the photosensitive layers of the photosensitive material selected for the photographic reproduction process.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a circuit diagram for a television receiver embodying the signal processor of this invention;

FIG. 4 is a circuit diagram for the signal processor of FIG. 3;

DESCRIPTION OF THE PREFERRED EMBODIMENTS

Figure 1:
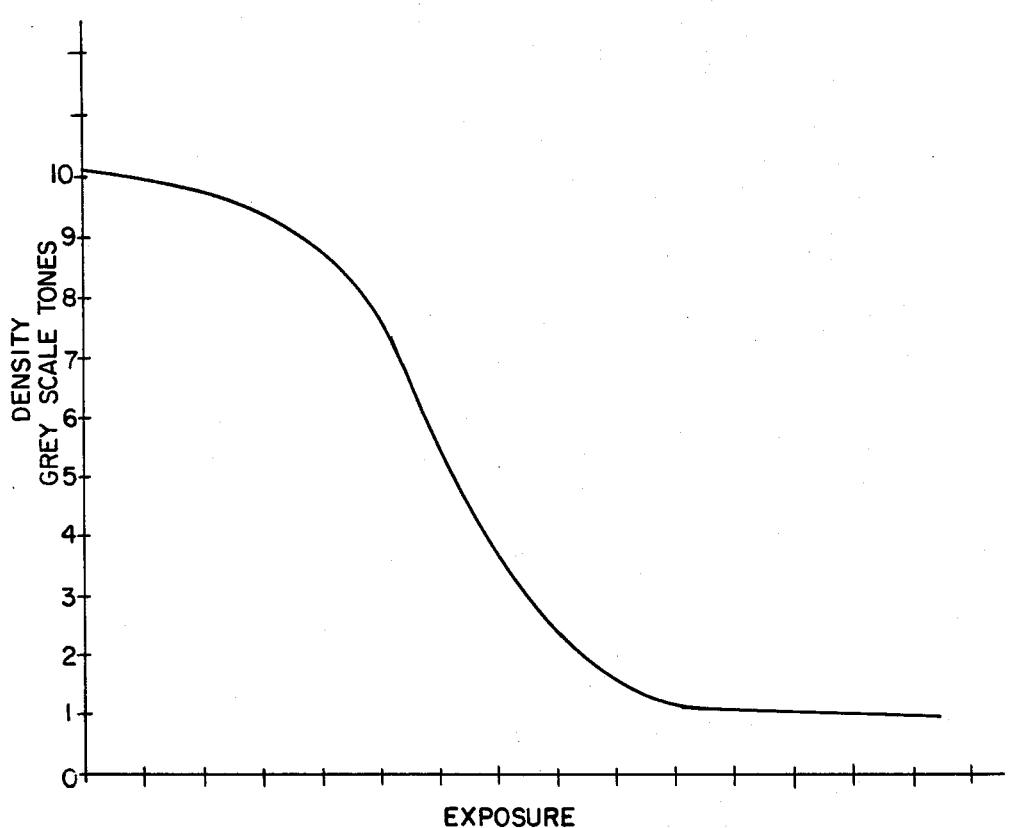
FIG. 1 is a typical sensitivity curve for a given photosensitive material.

Referring now to FIG. 3, there is shown generally at 10 a television receiver for receiving a conventional broadcast NTSC television signal by way of an antenna 12 which provides a signal to a receiver circuit 14. The receiver circuit 14 converts the broadcast NTSC television signal to red, green, and blue color separation video signals which, in turn, are directed by way of a switch arrangement 22 to the red, green, and blue signal terminals of a colored display screen which may comprise either a cathode ray tube 16 or a solid state display screen (not shown). In the event that the user desires to photograph and reproduce the image displayed on the screen of the cathode ray tube 16, he may utilize a camera 18 to photograph the image directly in a suitable lighttight chamber.

Photographic film suitable for use in the camera 18 may be of the self-developing type and typically have a transfer function represented by the curve of FIG. 1. The curve of FIG. 1 is well known in the art as an H and D curve named from the initials of the surnames of two scientists, Hurter and Driffield, who collaborated in establishing the first generally used system for measuring the sensitivity or speed of sensitized materials. The abscissa is calibrated in terms of log exposure and may be in such units as ergs/centimeter$^2$. The ordinate, in turn, represents the optical density of the photosensitive material and may for purposes of our illustration be calibrated in terms of ten grey scale tones wherein the fifth grey scale tone represents the average grey scale tone. As is readily apparent, the H and D curve of FIG. 1 is generally linear about the average grey scale tone 5 and thereafter progressively deviates from the linear function in correspondence with either increasing depth of tone or decreasing depth of tone from the average grey scale tone 5. It is this nonlinear transfer function of the photosensitive material which adversely affects the quality of any photographic reproduction made from the screen of the cathode ray tube 16.

Referring again to FIG. 3, it can be seen that the adverse effects resulting from the aforementioned nonlinear transfer function of the photosensitive material may be compensated for in the manner of this invention by a signal processor 20 which may be selectively connected between the receiver 14 and the cathode ray tube 16 by the switch arrangement 22. The signal processor is connected to receive the red, green, and blue color separation video signals from the receiver 14 and to provide modified red, green, and blue color separation video signals in the manner of this invention which are thereafter transmitted to the corresponding red, green, and blue input signal terminals to the cathode ray tube 16 by way of corresponding single throw switch contacts $24_R$, $24_G$, and $24_B$ of switch arrangement 22. As is readily apparent, the switch contacts $24_R$, $24_G$, and $24_B$ are all connected to switch in unison upon actuation of a push button 26 so as to connect either the red, green, and blue color separation video signal terminals of the receiver 14 directly to the corresponding input terminals of the cathode ray tube 16 or, alternatively, to connect the modified red, green, and blue color separation video signal output terminals from the signal processor 20 to the corresponding input terminals of the cathode ray tube 16.

Referring now to FIG. 4, there is shown a circuit diagram for the signal processor 20 comprising three signal processor channels 28, 30, and 32 each embodying identical circuitry as will now be described only in regard to processor channel 28. Processor channel 28 comprises a matrix circuit 34 having an operational amplifier 36, one input terminal to which the red color separation video signal is directed to and the other input terminal to which the green color separation video signal is directed to by way of an input resistor R1 and to which the blue color separation video signal is directed to by way of another input resistor R2. A feedback resistor R3 connects one input terminal to the output terminal of the operational amplifier 36. As previously discussed, like matrix circuits are also provided for processor channels 30 and 32 with the input connections maintained as shown by the input terminals 1 through 4.

The output signal from the matrix circuit 34, in turn, is directed to a transfer function circuit 38 which comprises an operational amplifier 40 having a feedback resistor R6 and two serially connected input resistors R4 and R5. The input resistor R5 is also connected in parallel relation with respect to a pair of diodes D1 and D2 which operates to limit the voltage across the resistor R5 to the anode to cathode junction drop which is typically in the order of 0.6 volts for silicon diodes. Again, the processor channels 30 and 32 have like transfer function circuits which operate on the green and blue color separation video signals, respectively.

When the user wishes to make a photographic representation with the camera 18 of the image displayed on the screen of the cathode ray tube 16, he first actuates the button 26 of the switch arrangement 22 to move the switch contacts $24_R$, $24_G$, $24_B$ downwardly to the position as shown in FIG. 3 so as to connect the output terminals from the signal processor 20 to the corresponding input terminals of the cathode ray tube 16 while simultaneously disconnecting the output terminals of the receiver 14 from the corresponding input terminals to the cathode ray tube 16. Thus, the red, green, and blue color separation video signals are directed to the corresponding input terminals of the processor channels 28, 30, and 32 as shown in FIG. 4. The red color separation video signal is matrixed with the green and blue color separation video signals by the circuit 34 in accordance with the following equation.

$$(e_r - V_{ref}) = \left[1 + \frac{R3}{R1} + \frac{R3}{R2}\right](R - V_{ref}) - \frac{R3}{R1}(G - V_{ref}) - \frac{R3}{R2}(B - V_{ref})$$

$V_{ref}$ is an analog voltage level corresponding to the average brightness of the video image, and $e_r$ is the output signal level from the matrix circuit 34. As will be readily understood, the reference voltage ($V_{ref}$) could be provided by a conventional gated averaging circuit (not shown). If it is assumed that $R1 = R2 = R3/a$, then the aforementioned equation reduces as follows.

$$(e_r - V_{ref}) = [1 + 2a](R - V_{ref}) - a(G - V_{ref}) - a(B - V_{ref})$$

In this manner, the relative amplitude of the red color separation video signal is increased or enhanced prior to being directed to the transfer function circuit 38; and, in like manner, the relative amplitude of the green and blue color separation signals are also respectively enhanced by like matrix circuits in processor channels 30 and 32.

The enhanced color separation signals provided by the matrix circuits of this invention operate to at least partly compensate for the mismatch in the spectral emission properties of the phosphors in the cathode ray tube 16 and the spectral sensitivities in the photosensitive layers of the photosensitive material to be exposed.

The transfer function of the circuit 38 is described by the following equation.

$$(R' - V_{ref}) = \left[1 + \frac{R6}{R4 + (R5 \| R_{D1} \| R_{D2})}\right](e_r - V_{ref})$$

Figure 2:
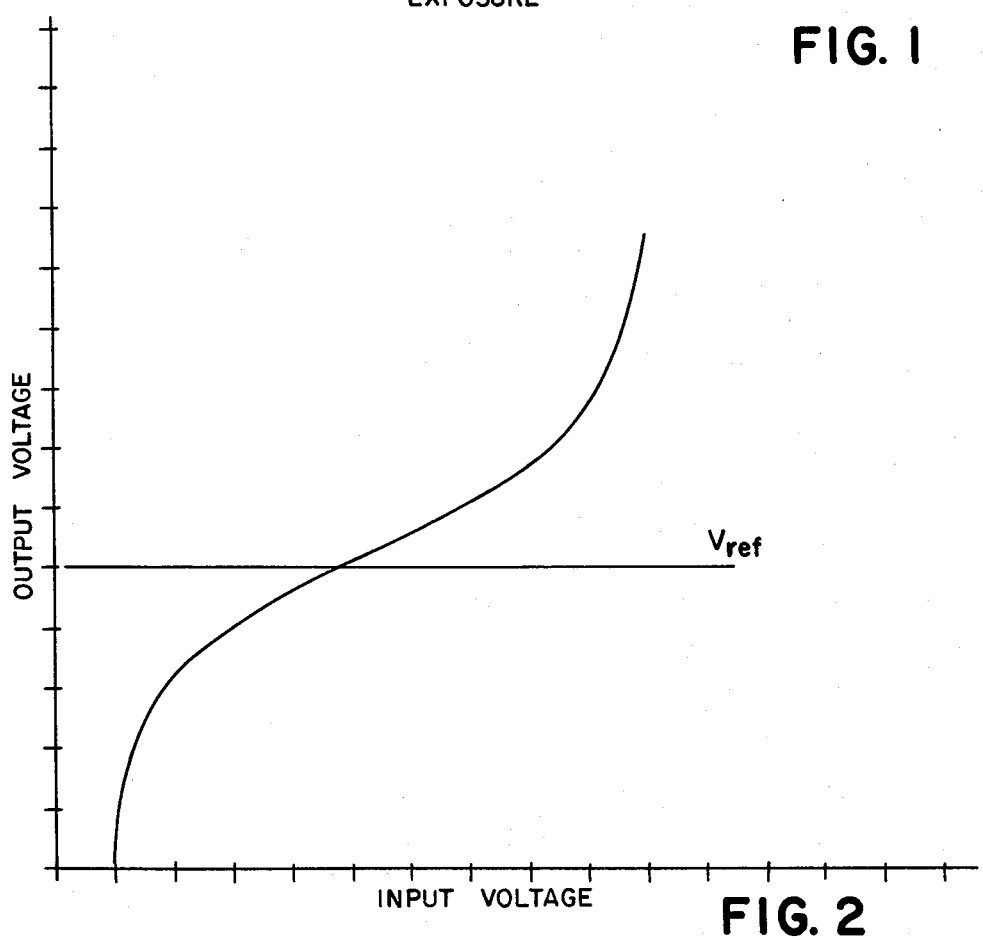
FIG. 2 is a gain curve showing the transfer function for the signal processing apparatus of this invention.

As is readily apparent, the effective resistance across R5 is determined by the parallel combination of R5 with the diodes D1 and D2—i.e., $(R5 \| R_{D1} \| R_{D2})$. This limits the maximum effective voltage drop across the resistor R5 to the anode to cathode junction drop across the diodes D1, D2 which typically is in the order of 0.6 volts for silicon diodes. Thus, the gain of the transfer function circuit 38 as shown in FIG. 2 is highly nonlinear and approximates the inverse of the transfer function of the photographic reproduction process as represented by the H and D curve of FIG. 1. In this manner, the red, green, and blue color separation video signals are compensated electrically to match the nonlinear sensitivity of the photosensitive material to provide a photographic image which substantially corresponds to the video image which would otherwise be displayed on the screen of the cathode ray tube 16 had the video signals not been modified by the signal processor 20 of this invention.

Figure 5:
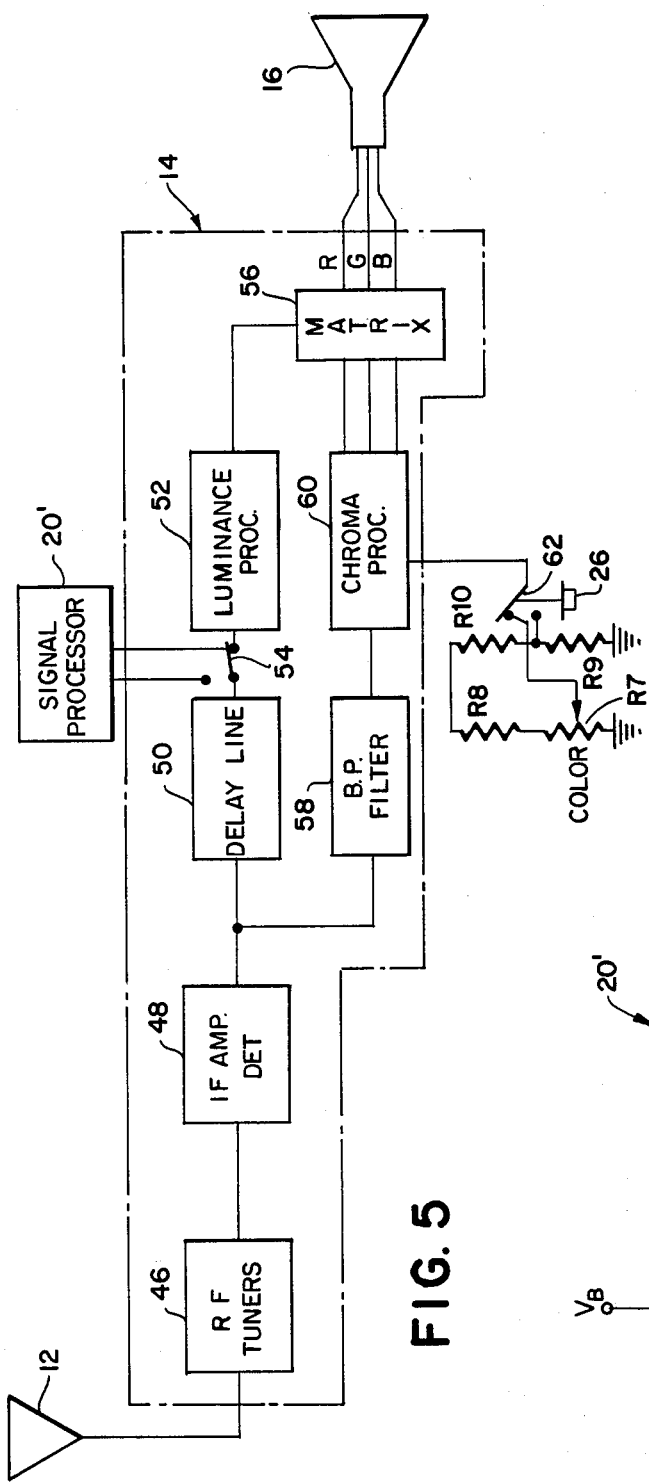
FIG. 5 is a detailed circuit diagram for the television receiver of FIG. 3 embodying an alternate embodiment for the signal processor of this invention.

Referring now to FIG. 5 where like numerals depict previously-described components, there is shown an alternate embodiment for the signal processor 20' which may be connected to modify only the luminance signal instead of the red, green, and blue color separation video signals as previously described. The receiver 14 comprises a radio frequency (RF) tuner 46 which receives the broadcast television signal from the antenna 12 in the aforementioned manner. The output signal from the radio frequency tuner 46, in turn, is directed to an intermediate frequency amplifier and detector 48 which, in turn, provides an output video signal which is divided between a luminance signal and a chrominance signal. The luminance signal is delayed by a delay line 50 and thereafter transmitted by way of a switch contact 54 to a luminance processor 52 which, in turn, provides the processed luminance signal to a matrix 56. The chrominance signal, in turn, is directed through a band pass filter 58 to a chrominance processor 60 which, in turn, provides red, green, and blue color separation signal information to the matrix 56. The matrix 56, in turn, provides red, green, and blue color separation video signal information to the cathode ray tube 16. The receiver unit 14 herein described is of a conventional type well known to the art and may be connected to operate with the signal processor 20' of this invention in the following manner.

The signal processor 20' may be connected in serial relation between the delay line 50 and the luminance processor 52 by the switch contact 54. The switch contact 54 is also ganged to operate in concert with another switch contact 62 which connects the chrominance processor to either one of a first variable resistance divider network comprising resistor R8 and potentiometer R7 or a second resistance divider network comprising resistors R9 and R10. Under normal operating conditions with the signal processor 20' disconnected, the switch contact 62 assumes the position as shown in the drawing and the resistor R7 may be selectively varied to change color saturation. In the event that the user desires to implement the photographic reproduction of the image on the screen of the cathode ray tube 16, he actuates the button 26 in the aforementioned manner to move the switch contacts 54 and 62 from their positions as shown in the drawing to simultaneously disconnect the variable resistance divider network R8, R7 from the chrominance processor 60, connect the fixed resistance divider network R10, R9 to the chrominance processor 60 and connect the signal processor 20 in serial relation between the delay line 50 and the luminance processor 52. Connecting the fixed resistance divider network R10, R9 in this manner operates to provide enhanced color saturation in order to at least partly compensate for the mismatch in the spectral emission properties of the phosphors in the cathode ray tube 16 and the spectral sensitivities in the photosensitive layers of the photosensitive material to be exposed as was previously described with respect to the matrix circuits of FIG. 4.

Figure 6:
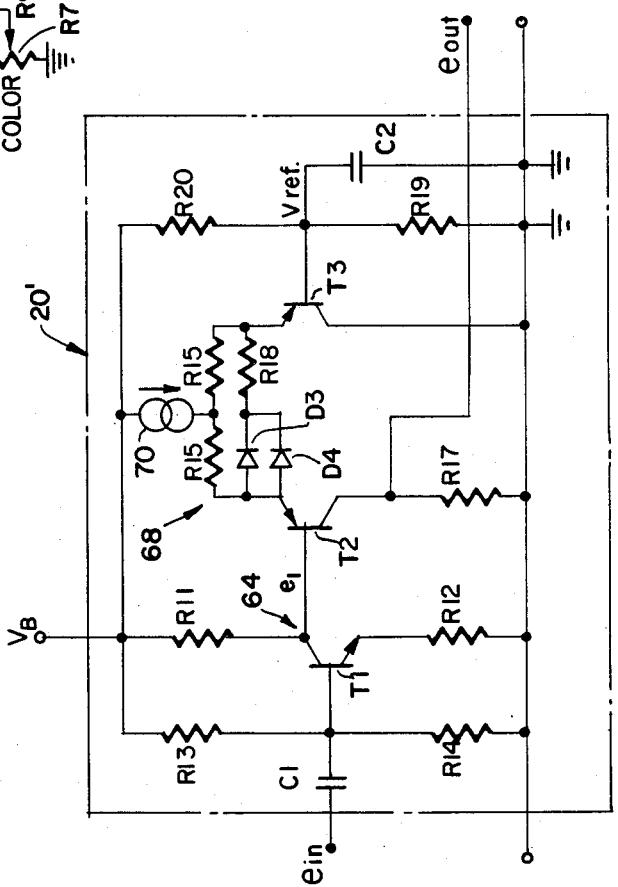
FIG. 6 is a circuit diagram for the signal processor of FIG. 5.

Referring now to FIG. 6, there is shown a circuit diagram for the signal processor 20' comprising an input amplifier stage as shown generally at 64. The amplifier stage 64 comprises an NPN transistor T1 having the collector terminal thereof biased by a resistor R11 and the emitter terminal thereof grounded by way of a resistor R12. The base terminal to the transistor T1, in turn, is biased by the resistance divider network R13 and R14. The input signal is transmitted to the base of the transistor T1 by way of a capacitor C1. The gain of the amplifier stage 64 is provided by the following equation.

$$e_1/e_{in} = -R11/R12$$

As is readily apparent, $e_1$ is the output signal level at the collector of the transistor $T_1$, and $e_{in}$ is the input signal level to the processor 20'.

The output from the amplifier stage 64 is directed to a differential amplifier as shown generally at 68 comprising two PNP transistors T2 and T3. The base of the transistor T2 is connected to receive the output signal $e_1$ from the collector of transistor T1 while the base of the transistor T3 is biased from a resistance divider network comprising the resistors R20 and R19 which are selected to provide the reference voltage ($V_{ref}$) corresponding to the average image brightness to the base of the transistor T3. As was previously discussed, the reference voltage ($V_{ref}$) could alternatively be provided by a conventional gated averaging circuit (not shown). The collector of transistor T2 is grounded by way of a resistor R17 and provides the output voltage terminal from the signal processor 20'. A constant current source 70 provides a constant input source of current which is divided by resistors R15 to the emitters of transistors T2 and T3, respectively. The resistors R15, in turn, are connected in parallel relation with respect to a resistor R18 in series connection with a pair of parallel connected diodes D3 and D4. Again, as is readily apparent, the voltage drop across the parallel connected diodes D3 and D4 cannot exceed the normal anode to cathode junction drop across a diode which in the case of a silicon diode approximates 0.6 volts.

The gain of the differential amplifier 68 is shown by the following equation.

$$\frac{e_{out}}{e_1} = \frac{-R17}{2R15 \| [R18 + (R_{D3} \| R_{D4})]}$$

Thus, as is now readily apparent, under conditions where the input voltage level approximates the voltage reference level ($V_{ref}$) corresponding to the average image brightness, the response of the differential amplifier 68 is substantially linear since little or no current flows through the diodes D3 and D4 and the gain of the amplifier approximates the following equation.

$$e_{out}/e_1 = -R17/2R15$$

Conversely, if the voltage level $e_1$ substantially deviates from the voltage reference level $V_{ref}$ corresponding to the average image brightness, then the gain of the amplifier 68 becomes substantially nonlinear as a result of the increased current flow through the diodes D3 and D4 so as to approximate the gain of the curve as shown in FIG. 2. The maximum gain of the differential amplifier 68 therefore approximates the following equation.

$$e_{out}/e_1 = -R17/2R15 \| R18$$

Thus, the gain of the differential amplifier 68 provides the transfer function that approximates the inverse of the transfer function of the photographic reproduction process utilized to photograph an image from the screen of the cathode ray tube 16. As is readily apparent, the signal processor 20' operates only on the luminance signal which is thereafter matrixed with the chrominance signals to provide the red, green, and blue color separation video signals to the cathode ray tube 16. In this manner, the signal processor 20' may only comprise a single differential amplifier in comparison to the embodiments of FIG. 4 where three channels were required to provide the transfer function to the three color separation signals, respectively.

As is readily apparent, the signal processor of this invention may be incorporated in any conventional television receiver thereby enabling the screen of the cathode ray tube to be photographed in a satisfactory manner upon the actuation of a button which operates in the aforementioned manner to connect the signal processor into its operative mode. It will be readily understood that the button which operates to connect the signal processor into its operative mode may be the shutter button that commences the photographic exposure interval.

Other embodiments of the invention, including additions, subtractions, deletions and other modifications of the preferred disclosed embodiments of the invention will be obvious to those skilled in the art and are within the scope of the following claims.

What is claimed is:

1. A signal processor for use with a color television receiver of the type having a colored display screen, comprising:

circuit means for receiving color video signals from the color television receiver in order to impose a select transfer function to the received color video signals which function generally approximates the inverse of the transfer function of a selected photographic reproduction process so as to produce modified video signals which when transmitted to the color television receiver operate to produce an image on the display screen of the television receiver in accordance with said select transfer function such that a photographic image of the display screen made by said selected photographic process will substantially visually correspond to the video image which would otherwise be displayed on the display screen if the video signals had not been modified by said circuit means, wherein said circuit means also includes means for further modifying the video signals so that when the video signals are transmitted to the television receiver, the saturation of the imaged colors on the display screen is enhanced to at least partly compensate for a mismatch in the spectral emission properties of the display screen and the spectral sensitivities in the photosensitive layers of a photosensitive material selected for the photographic reproduction process; and means for connecting said circuit means to receive said video signals from the receiver and to transmit said modified video signals back to the colored display source.

2. The processor of claim 1 wherein the display screen comprises a cathode ray tube and the mismatch in the spectral emission properties of the phosphors in the cathode ray tube and the spectral sensitivities in the photosensitive layers of the photosensitive material are compensated for by said means for further modifying the video signals.

3. The processor of claim 1 wherein said connecting means is selectively operable for connecting and disconnecting said circuit means from the television receiver.

4. The processor of claim 1 wherein the transfer function of the selected photographic reproduction process defines the measured densities of the photosensitive material as a function of a select range of exposures.

5. The processor of claim 4 wherein the transfer function of the selected photographic reproduction process is generally linear about its average grey scale tone and progressively deviates from this linear function in correspondence with a depth of tone which is either increasing or decreasing from its average grey scale tone and wherein said circuit means comprises amplifier means having a gain characteristic which is generally linear about a reference voltage corresponding to the average brightness of the image and which progressively deviates from its linear characteristic in correspondence with an input voltage which is either increasing or decreasing from said reference voltage.

6. The processor of claim 5 wherein said connecting means may be connected to receive the red, green, and blue color separation signals of said video signals and wherein said amplifier means comprises three operational amplifiers each connected to receive a respective one of said color separation signals from said connecting means and each having a nonlinear gain characteristic determined by a feedback resistor and a nonlinear input resistance and wherein the modified color separation output signals from said operational amplifiers are directed respectively by said connecting means to the display screen of the television receiver.

7. The processor of claim 6 wherein said circuit means further comprises matrix circuits for matrixing the red, green, and blue color separation signals received from said connecting means before transmission to respective ones of said operational amplifiers in order to enhance the saturation of the colors imaged on the display screen to compensate for a mismatch in the spectral emission properties of the display screen and the spectral sensitivities in the photosensitive layers of a photosensitive material selected for the photographic reproduction process.

8. A color television receiver comprising:
a colored display screen;
means for receiving and converting a television signal to color video signals operative when connected to said display screen to produce a first image on said display screen suitable for viewing;
signal processing means for receiving the color video signals from the receiving means in order to impose a select transfer function to the received color video signals which function generally approximates the inverse of the transfer function of a selected photographic reproduction process so as to produce modified video signals which when transmitted either directly or by way of said receiving means to said display screen operate to produce a second image on said display screen in accordance with said select transfer function such that a photographic image of said display screen made by said selected photographic process will substantially visually correspond to said first image, wherein said processing means includes means for further modifying the video signals so that when the video signals are transmitted to said display screen, the saturation of the imaged colors on said display screen is enhanced to at least partly compensate for a mismatch in the spectral emission properties of said display screen and the spectral sensitivities in the photosensitive layers of a photosensitive material selected for the photographic reproduction process; and
means for connecting said signal processing means to receive the color video signals and to transmit the modified video signals to produce said second image on said display screen while simultaneously disconnecting said video signals from producing said first image.

9. The receiver of claim 8 wherein said display screen comprises a cathode ray tube and the mismatch in the spectral emission properties of the phosphors in the cathode ray tube and the spectral sensitivities in the photosensitive layers of the photosensitive material are compensated for by said means for further modifying the video signals.

10. The receiver of claim 8 wherein said connecting means is selectively operable for connecting and disconnecting said processing means.

11. The receiver of claim 8 wherein the transfer function of the selected photographic reproduction process defines the measured densities of the photosensitive material as a function of a select range of exposures.

12. The receiver of claim 11 wherein the transfer function of the selected photographic reproduction process is generally linear about its average grey scale tone and proressively deviates from this linear function in correspondence with a depth of tone which is either increasing or decreasing from its average grey scale tone and wherein said signal processing means comprises amplifier means having a gain characteristic which is generally linear about a reference voltage corresponding to the average brightness of the image and which progressively deviates from its linear characteristic in correspondence with an input voltage which is either increasing or decreasing from said reference voltage.

13. The receiver of claim 12 wherein said connecting means may operate to connect red, green, and blue color separation signals of said video signals from said receiving means to said signal processing means and wherein said amplifier means comprises through operational amplifiers each connected to receive a respective one of said color separation signals from said connecting means and each having a nonlinear gain characteristic determined by a feedback resistor and a nonlinear input resistance, and wherein the modified color separation output signals from said operational amplifiers are directed respectively by said connecting means to said display screen.

14. The receiver of claim 13 wherein said signal processing means further comprises matrix circuits for matrixing the red, green, and blue color separation signals received from said connecting means before transmission to respective ones of said operational amplifiers in order to enhance the saturation of the colors imaged on said display screen to compensate for a mismatch in the spectral emission properties of said display screen and the spectral sensitivities in the photosensitive layers of a photosensitive material selected for the photographic reproduction process.

15. A signal processor for use with a color television receiver of the type having a colored display screen comprising:
circuit means for receiving color video signals from the color television receiver in order to modify the video signals so that when the modified video signals are transmitted to the television receiver, the saturation of the imaged colors on the display screen is enhanced in order to compensate when a photographic image of the display screen is made by a select photographic process for a mismatch in the spectral emission properties of the display screen and the spectral sensitivities in the photosensitive layers of a photosensitive material selected for said photographic reproduction process, wherein the display screen comprises a cathode ray tube and said circuit means at least partly compensates for the mismatch in the spectral emission properties of the phosphors in the cathode ray tube and the spectral sensitivities in the photosensitive layers of the photosensitive material; and
means for connecting said circuit means to receive said video signals from the receiver and to transmit said modified video signals to the display screen.

16. A signal processor for use with a color television receiver of the type having a colored display screen comprising:
circuit means for receiving color video signals from the color television receiver in order to modify the video signals so that when the modified video signals are transmitted to the television receiver, the saturation of the imaged colors on the display screen is enhanced in order to at least partly compensate when a photographic image of the display screen is made by a select photographic process for a mismatch in the spectral emission properties of the display screen and the spectral sensitivities in the photosensitive layers of a photosensitive material selected for said photographic reproduction process; and
means for connecting said circuit means to receive said video signals from the receiver and to transmit said modified video signals back to the display screen wherein said connecting means may be connected to receive the red, green, and blue color separation signals of said video signals and wherein said circuit means comprises matrix circuits for matrixing the red, green, and blue color separation signals received from said connecting means in order to enhance the saturation of the colors imaged on the display screen.

17. A signal processor for use with a color television receiver of the type having a colored display screen comprising:

circuit means for receiving color video signals from the color television receiver in order to modify the video signals so that when the modified video signals are transmitted to the television receiver, the saturation of the imaged colors on the display screen is enhanced in order to at least partly compensate when a photographic image of the display screen is made by a select photographic process for a mismatch in the spectral emission properties of the display screen and the spectral sensitivities in the photosensitive layers of a photosensitive material selected for said photographic reproduction process; and means for connecting said circuit means to receive said video signals from the receiver and to transmit said modified video signals to the display screen wherein the color television receiver includes means for receiving and processing the chrominance portion of the video signal, and said circuit means includes a resistance divider network, said connecting means being operable to connect said resistance divider network to the chrominance processing means in order to provide the enhanced saturation of the colors imaged on the display screen.

* * * * *